US009904282B2

(12) United States Patent
Tabuchi et al.

(10) Patent No.: US 9,904,282 B2
(45) Date of Patent: Feb. 27, 2018

(54) WORK PLANNER, METHOD FOR PLANNING WORK, AND COMPUTER-READABLE STORAGE MEDIUM STORING A WORK PLANNING PROGRAM

(71) Applicant: KABUSHIKI KAISHA YASKAWA DENKI, Kitakyushu (JP)

(72) Inventors: Kazuma Tabuchi, Kitakyushu (JP); Masaru Adachi, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 107 days.

(21) Appl. No.: 14/642,636

(22) Filed: Mar. 9, 2015

(65) Prior Publication Data

US 2016/0075019 A1 Mar. 17, 2016

(30) Foreign Application Priority Data

Sep. 16, 2014 (JP) ................. 2014-188265

(51) Int. Cl.
*G05B 19/418* (2006.01)

(52) U.S. Cl.
CPC ......... *G05B 19/41865* (2013.01); *G05B 2219/32269* (2013.01); *G05B 2219/32271* (2013.01); *Y02P 90/20* (2015.11); *Y10S 901/02* (2013.01)

(58) Field of Classification Search
CPC ........ G05B 19/41865; G05B 191/0088; G05B 2219/32269; G05B 2219/32271;
(Continued)

(56) References Cited

U.S. PATENT DOCUMENTS

| 6,438,436 | B1 * | 8/2002 | Hohkibara | ............. | G06Q 10/06 700/100 |
| 7,765,028 | B2 * | 7/2010 | Orita | .................... | G05D 1/0088 700/101 |

(Continued)

FOREIGN PATENT DOCUMENTS

JP 2003-200368 7/2003

OTHER PUBLICATIONS

Certificate of Qualification for Exceptions to Lack of Novelty of Invention filed in JPO on Sep. 24, 2014 with a Certified English translation, enclosing, Filing Sheet attached to the Certificate, a technical material entitled "A Method for Planning and Performing Work Involving Parallel Actions of Robot and Automatic Appliances" and Tabuchi et al., "A method for making and executing a plan that a robot and automated machines process in parallel" (English abstract included) presented at the 19th Robotics Symposia on Mar. 14, 2014, Japan.

*Primary Examiner* — Abby Y Lin
(74) *Attorney, Agent, or Firm* — Mori & Ward, LLP

(57) ABSTRACT

A work planner includes a divider and an adjustor. Based on action information including a plurality of first actions indicating work units that involve one executor or a plurality of executors including a robot and that start at respective defined start timings, the divider is configured to divide one action among the plurality of first actions that involves the plurality of executors into a plurality of second actions corresponding to the respective plurality of executors. Based on dependency information indicating a relationship of dependency among the plurality of first actions including the plurality of second actions, the adjustor is configured to adjust a start timing of at least one of third actions, among the plurality of first actions, that involve an identical executor.

20 Claims, 10 Drawing Sheets

(58) Field of Classification Search
CPC ........... G06Q 10/06; G06Q 10/063111; G06Q 10/063116; G06Q 10/06312; Y02P 90/20
USPC .................................................. 718/102–107
See application file for complete search history.

(56) References Cited

U.S. PATENT DOCUMENTS

| | | | | |
|---|---|---|---|---|
| 2008/0033778 A1* | 2/2008 | Boss | ................... | G06Q 10/109 705/7.18 |
| 2014/0351819 A1* | 11/2014 | Shah | .................... | G06F 9/4887 718/103 |
| 2015/0193722 A1* | 7/2015 | Seaman | ............... | G06Q 10/109 705/7.15 |

* cited by examiner

TC1

| Executor (CL1) | Action name (CL2) | Start timing (CL3) |
|---|---|---|
| Robot | Set food in the microwave oven | a1 |
| Robot and microwave oven | Heat the food in the microwave oven | a2 |
| Robot | Move to the front of the shelf | a3 |
| Robot | Take a dish from the shelf | a4 |
| Robot | Move to the front of the microwave oven | a5 |
| Robot | Take the food from the microwave oven | a6 |

…

WORK PLANNER, METHOD FOR PLANNING WORK, AND COMPUTER-READABLE STORAGE MEDIUM STORING A WORK PLANNING PROGRAM

CROSS-REFERENCE TO RELATED APPLICATIONS

The present application claims priority under 35 U.S.C. § 119 to Japanese Patent Application No. 2014-188265, filed Sep. 16, 2014. The contents of this application are incorporated herein by reference in their entirety.

BACKGROUND

Field of the Invention

The embodiments disclosed herein relate to a work planner, a method for planning work, and a computer-readable storage medium storing a work planning program.

Discussion of the Background

Japanese Unexamined Patent Application Publication No. 2003-200368 discloses a work planner to prepare a work plan involving a plurality of executors such as robots. The work planner combines action commands for a plurality of robots with each other to prepare a work plan in which the robots cooperate in work.

As used herein, the action command refers to a command for making each robot perform actions corresponding to a piece of teaching data of the robot divided in accordance with a predetermined element such as work on a work point.

SUMMARY

According to one aspect of the present disclosure, a work planner includes a divider and an adjustor. Based on action information including a plurality of first actions indicating work units that involve one executor or a plurality of executors including a robot and that start at respective defined start timings, the divider is configured to divide one action among the plurality of first actions that involves the plurality of executors into a plurality of second actions corresponding to the respective plurality of executors. Based on dependency information indicating a relationship of dependency among the plurality of first actions including the plurality of second actions, the adjustor is configured to adjust a start timing of at least one of third actions, among the plurality of first actions, that involve an identical executor.

According to another aspect of the present disclosure, a method for planning work includes, based on action information including a plurality of first actions indicating work units that involve one executor or a plurality of executors including a robot and that start at respective defined start timings, one action among the plurality of first actions that involves the plurality of executors is divided into a plurality of second actions corresponding to the respective plurality of executors. A start timing of at least one of third actions, among the plurality of first actions, that involve an identical executor is adjusted based on dependency information indicating a relationship of dependency among the plurality of first actions including the plurality of second actions.

According to the other aspect of the present disclosure, a computer-readable storage medium stores a work planning program for causing a computer to execute processing. The processing includes, based on action information including a plurality of first actions indicating work units that involve one executor or a plurality of executors including a robot and that start at respective defined start timings, one action among the plurality of first actions that involves the plurality of executors is divided into a plurality of second actions corresponding to the respective plurality of executors. A start timing of at least one of third actions, among the plurality of first actions, that involve an identical executor is adjusted based on dependency information indicating a relationship of dependency among the plurality of first actions including the plurality of second actions.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

A work planner, a method for planning work, and a computer-readable storage medium storing a work planning program according to embodiments will be described in detail below with reference to the accompanying drawings. The following embodiments are provided for exemplary purposes only and are not intended to limit the present disclosure.

Figure 1:
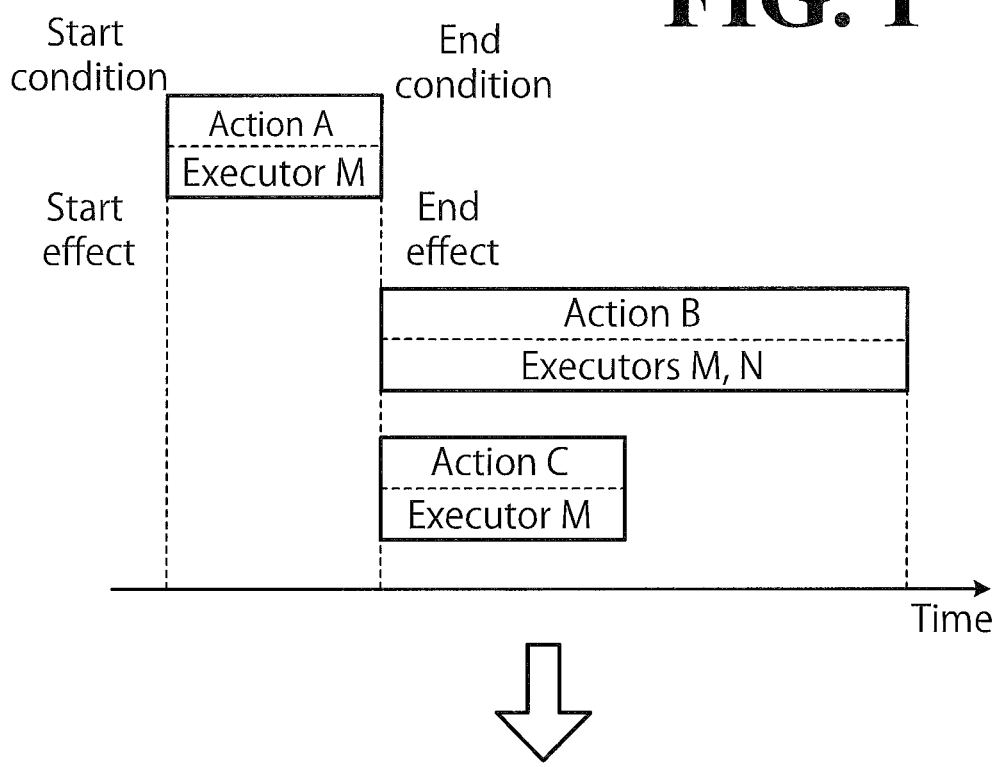
FIG. 1 is a diagram schematically illustrating a method for planning work according to an embodiment.
Figure 1:
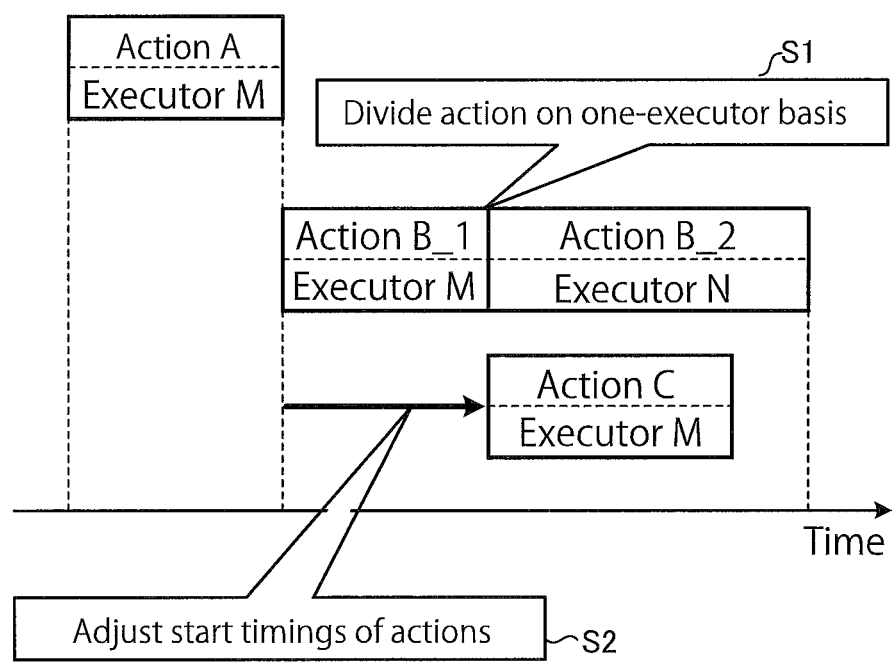

First, by referring to FIG. 1, the method for planning work according to this embodiment will be described. FIG. 1 is a diagram illustrating the method for planning work according to this embodiment. FIG. 1 illustrates an outline of the method for planning work according to this embodiment. The upper chart of FIG. 1 represents time before start times of actions are adjusted by the method for planning work according to this embodiment. The lower chart of FIG. 1 represents time after the start times of the actions are adjusted by the method for planning work according to this embodiment.

As used herein, an action refers to a unit of abstract work (task) such as "move to a predetermined position", "hold a predetermined object", and "heat a predetermined object". An action involves one executor or a plurality of executors as leading entities to execute work. In an exemplary case of an action involving a plurality of executors, an action "heat a predetermined object" is performed by two executors, namely, a heater (such as a microwave oven) and a robot to conduct a start operation of the heater.

As seen from action A in the upper chart of FIG. 1, each action has attributes such as a start condition, a start effect, an end condition, and an end effect. The start condition refers to a condition for starting the action and includes, for example, a condition "the microwave oven is not in use". The start effect refers to an effect obtained by starting the action and indicates, for example, a change to a state "the microwave oven is in use".

The end condition refers to a condition for ending the action. However, when the action ends automatically, the end condition is unnecessary. The end effect refers to an effect obtained by ending the action and indicates, for example, a change to a state "the microwave oven is not in use".

In addition to these attributes, each action has a duration (time span) of work as an attribute. The duration corresponds to a width of the action along a time axis illustrated in FIG. 1.

In the method for planning work according to this embodiment, a plurality of actions illustrated in the upper chart of FIG. 1 are received. Among the received actions, an action involving a plurality of executors is divided into actions corresponding to the respective executors. The actions including the divided actions are adjusted as to start time. Thus, by the method for planning work according to this embodiment, a parallel and effective work plan involving a plurality of executors is prepared.

Specifically, as illustrated in the upper chart of FIG. 1, in the method for planning work according to this embodiment, an action group including actions involving a single executor and an action involving a plurality of executors are received. The executors include a robot (not illustrated). In the case of the upper chart of FIG. 1, action A and action C involve one executor (both involve executor M), and action B involves two executors (executors M and N).

For ease of understanding of description, the upper chart of FIG. 1 illustrates a case in which pieces of information of the actions subjected to start time adjustment are placed on the time axis. The actions subjected to start time adjustment, however, are not necessarily placed on the time axis. That is, it is possible to subject actions with undefined start times to start time adjustment. In this case, the method for planning work according to this embodiment involves defining the start time of each action, which will be described later.

In the method for planning work according to this embodiment, processing illustrated in the lower chart of FIG. 1 is executed based on the information illustrated in the upper chart of FIG. 1. Specifically, action B, which involves executors M and N, is divided into action B_1, which involves executor M, and action B_2, which involves executor N (see step S1 of FIG. 1). A method of dividing action B will be described in detail later.

Subsequently, in the method for planning work according to this embodiment, now that the actions in the action group have been made to involve a fixed number of executors, start timing adjustment is performed among the actions. For example, in the method for planning work according to this embodiment, start timing adjustment is performed to avoid overlapping of the plurality of actions involving an identical executor on the time axis. While FIG. 1 illustrates a case in which each divided action involves a single executor, this should not be construed in a limiting sense. Another possible example is that two executors cooperate in work and are regarded as one group.

As illustrated in the lower chart of FIG. 1, action C and action B_1, which is a division of action B, have executor M in common. That is, if the start time of action C is unchanged from its original start time illustrated in the upper chart of FIG. 1, action B_1 and action C overlap with each other. In view of this, as illustrated in the lower chart of FIG. 1, in the method for planning work according to this embodiment, for example, the start time of action C is delayed to avoid overlapping of action B_1 and action C (see step S2 in FIG. 1).

In the method for planning work according to this embodiment, a relationship of a plurality of actions that do not involve an identical executor on the time axis is adjusted in accordance with work to be planned. FIG. 1 illustrates exemplary case in which at least two of a plurality of actions that do not involve an identical executor are adjusted to overlap with each other on the time axis. As illustrated in the lower chart of FIG. 1, action B_2, which is a division of action B, and action C involve different executors. In view of this, in the method for planning work according to this embodiment, the start time of action C is adjusted to make action B_2 and action C overlap with each other.

FIG. 1 illustrates a case in which at least two of a plurality of actions that do not involve an identical executor overlap with each other on the time axis. This, however, should not be construed in a limiting sense. For example, if two robots work on a single object simultaneously to interfere with each other, the plurality of actions may be adjusted not to overlap with each other. It is also possible to adjust a plurality of actions into any desired relationship on the time axis in accordance with work to be planned.

While FIG. 1 illustrates a case in which a single action involves two executors, this should not be construed in a limiting sense. Another possible example is that a single action involves three or more executors. While FIG. 1 illustrates a case in which one of the plurality of executors is a robot, this should not be construed in a limiting sense. Another possible example is that the plurality of executors include any desired number of robots. All of the plurality of executors may be robots. When a robot such as a dual-arm robot has a plurality of hands, each hand may be regarded as an executor.

Figure 2:
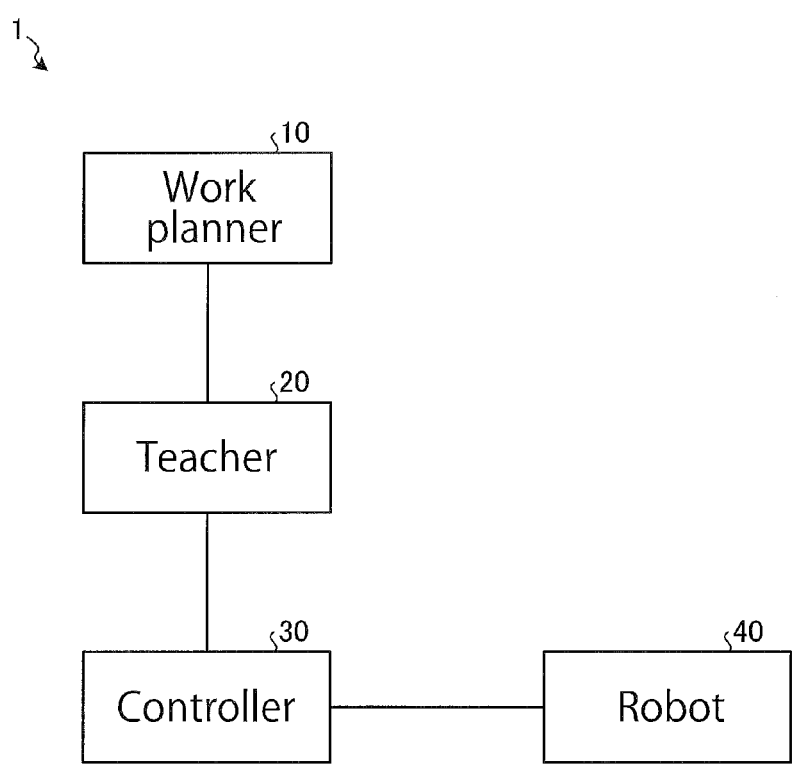
FIG. 2 is a block diagram illustrating a configuration of a robot system.

Next, by referring to FIG. 2, a robot system 1 according to this embodiment will be described. FIG. 2 is a block diagram illustrating a configuration of the robot system 1.

The following description will take as an example a service robot system including what is called a service robot to serve dishes. This, however, should not be construed in a limiting sense. The service robot system according to this embodiment will find applications in, for example, a biomedical robot system to prepare and process reagents, and an industrial robot system to perform welding work, coating work, assembling work, and grinding work. In the following description, the service robot will be referred to as "robot", and the service robot system will be referred to as "robot system".

As illustrated in FIG. 2, the robot system 1 includes a work planner 10, a teacher 20, a controller 30, and a robot 40. The work planner 10 implements the method for planning work illustrated in FIG. 1. The work planner 10 prepares a work plan concerning executors including the robot 40 based on an input from an operator, and outputs the work plan to the teacher 20. The work planner 10 will be described in detail later with reference to FIG. 3 and the subsequent drawings.

The teacher 20 generates teaching data concerning actions of the robot 40 based on the work plan received from the work planner 10. Then, based on the teaching data, the teacher 20 generates a job program for operating the robot 40. While FIG. 2 illustrates a case in which the work planner 10 and the teacher 20 are separate components, the teacher 20 may incorporate the work planner 10 or the work planner 10 may incorporate the teacher 20.

An example of the robot 40 according to this embodiment is a self-propelled robot including a hand on a distal end of an arm. The job program includes data concerning actions such as movement and stopping of the robot 40 and movement and object holding of the hand. The controller 30 controls the robot 40 to operate in accordance with the input job program.

Figure 3:
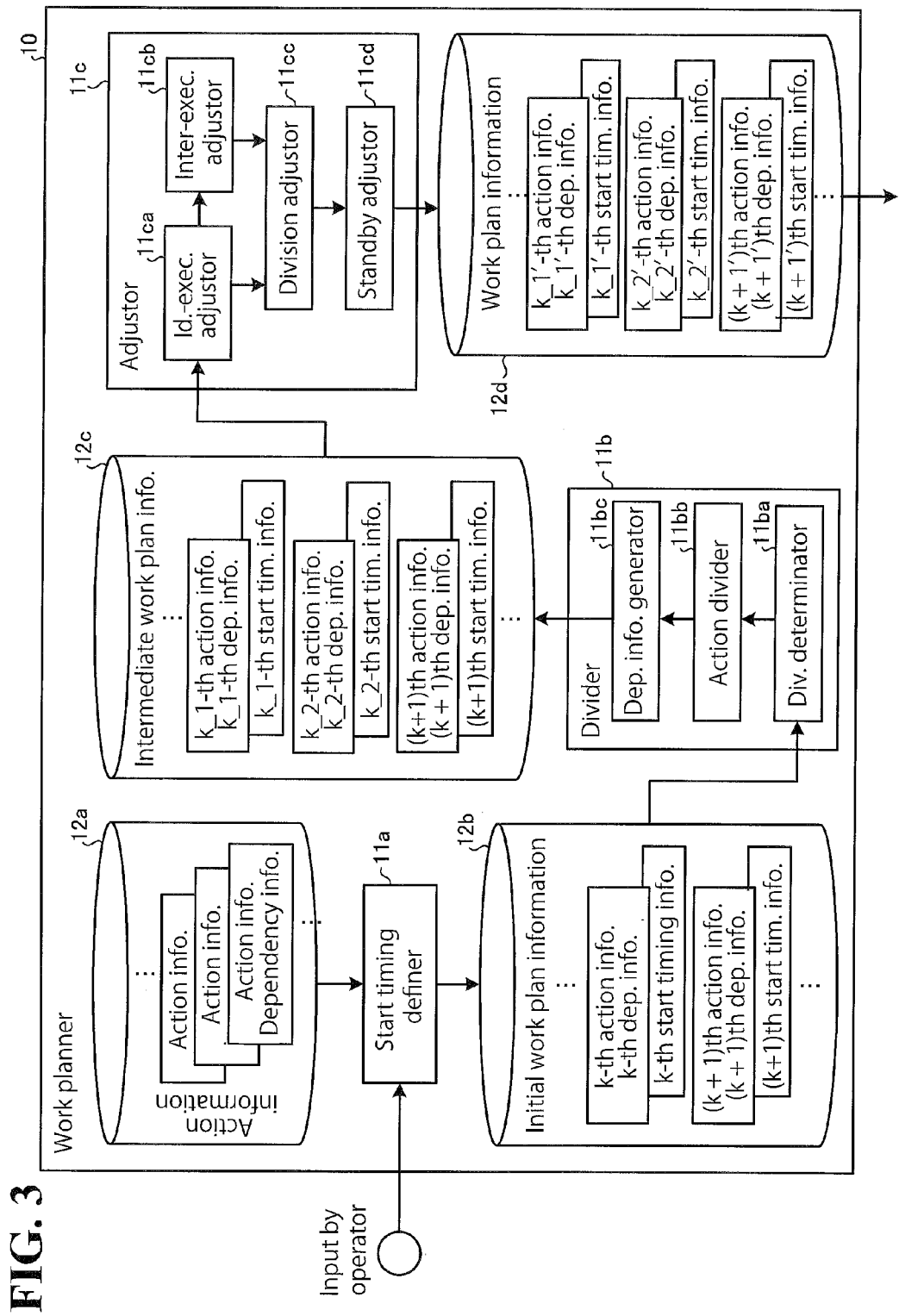
FIG. 3 is a block diagram illustrating a configuration of a work planner.

Next, by referring to FIG. 3, a configuration of the work planner 10 will be described. FIG. 3 is a block diagram illustrating a configuration of the work planner 10. It is noted that FIG. 3 only illustrates those components necessary for description of the work planner 10, omitting those components of general nature.

As illustrated in FIG. 3, the work planner 10 includes a start timing definer 11a, a divider 11b, and an adjustor 11c. The work planner 10 stores action information 12a, initial work plan information 12b, intermediate work plan information 12c, and work plan information 12d in a storage not illustrated. The storage is a storage device such as a memory and a hard disk drive.

The divider 11b further includes a dividability determiner 11ba, an action divider 11bb, and a dependency information generator 11bc. The adjustor 11c further includes an identical-executor adjustor 11ca, an inter-executorial adjustor 11cb, a division adjustor 11cc, and a standby adjustor 11cd.

The action information 12a is a set of pieces of action information corresponding to the above-described respective work units (tasks). Each piece of action information includes an identifier to identify an action, the details of the work of the action, the executor(s) of the work, and duration of the work. Each piece of action information includes dependency information indicating a relationship with other actions.

The number of executor(s) that each piece of action information includes should not be limited to one; two or more executors are also possible. Fixing the number of executors in this manner ensures preparation of a multilayered (stratified) work plan such as a combination of actions and a combination of works by executors in each action.

For example, assume that one action involves a plurality of robots to serve as executors. In this case, the action is incorporated into a work plan, and then a determination is made as to cooperation among the plurality of robots in the action, and a determination is made as to which robot among the plurality of robots is to work.

Thus, a work plan is prepared on a one-action basis. This enhances efficiency in producing a work plan for the target work. Further, a determination can be made as to which works of executors are to be combined on a one-action basis, and a determination can be made as to which executor is to perform work. This ensures a meticulous examination to be conducted in response to, for example, shortened takt time. In addition, a work plan is prepared in advance on a one-action basis, and a determination can be made after the preparation of the work plan as to which executor is to perform work. This increases the degree of freedom in producing the work plan.

As used herein, dependency information refers to information indicating a relationship of dependency among actions. The dependency information indicates such a relationship among a plurality of actions that an effect of a preceding action (the above-described start effect and end effect) satisfies part or all of start conditions for a succeeding action.

For example, in a case of a series of actions "take a dish from the shelf and move the dish to the table" is taken as an example. Here, "have the dish at hand" is an end effect of the action "take a dish from the shelf". Then, "have the dish at hand" is a condition for starting the action "move the dish to the table".

Unless the end effect of the action "take a dish from the shelf" is satisfied, the condition for starting the action "move the dish to the table" is not satisfied. Therefore, the action "take a dish from the shelf" and the action "move the dish to the table" are regarded as being in a relationship of mutual dependence.

In a case of an action "move a cup to the table", a condition for starting the action is "have a cup at hand", which is not influenced by "have the dish at hand" Therefore, the action "take a dish from the shelf" and the action "move a cup to the table" are not regarded as being in a relationship of mutual dependence.

The dependency information may not necessarily be based on an effect of an action but may be based on a start/end of an action. In this case, an end condition (end state) of a preceding action is a condition for starting a succeeding action. The relationship of dependence may be based on an effect of an action and a start/end of the action.

FIG. 3 illustrates a case in which each piece of action information in the action information 12a includes dependency information. The action information 12a, however, may not necessarily include dependency information. In this case, the start timing definer 11a, described later, generates dependency information based on the action information 12a without dependency information.

The start timing definer 11a defines a start timing for each piece of action information included in the action information 12a. The start timing may be defined using an algorithm, which will be described later, or may be defined by manual input from an operator. Specifically, for example, a rectangle corresponding to each piece of action information is indicated on the time axis on the display, and the operator moves the rectangle. It is also possible for the operator to correct a start timing that has been defined based on an algorithm. It is also possible for the operator to use an algorithm to correct a start timing that has been roughly defined.

Figures 4A, 4B:
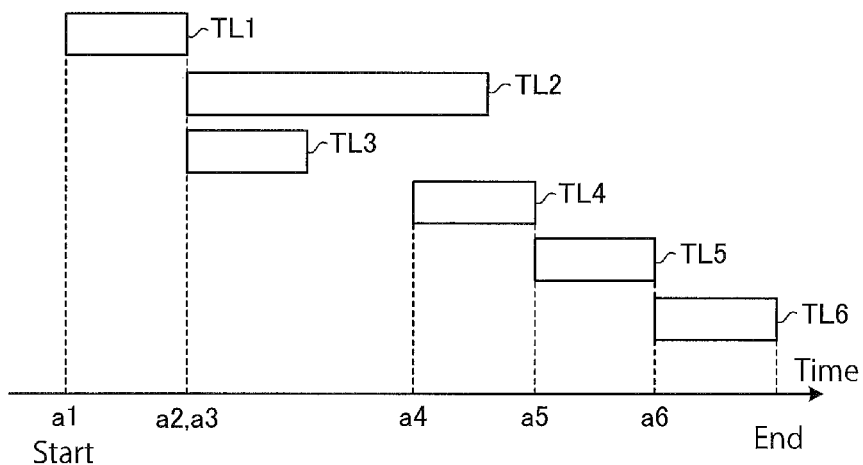
FIG. 4A illustrates a first aspect of processing performed by a start timing definer.
FIG. 4B illustrates a second aspect of the processing the processing performed by the start timing definer.

Referring to FIGS. 4A and 4B, description will be made with regard to processing performed by the start timing definer 11a. In the following description, a case is taken as an example in which target work (set of actions indicating a unit of work) is "while heating food in the microwave oven, prepare a dish for the food to be put on".

FIGS. 4A and 4B respectively illustrates a first aspect and a second aspect of the processing performed by the start timing definer 11a. Based on target work input from the operator, the start timing definer 11a extracts relevant pieces of action information from the action information 12a. Then, the start timing definer 11a defines start timings for the respective pieces of action information.

Referring to table TC1 illustrated in FIG. 4A, the items in column CL1 (executor) and column CL2 (action name) are exemplary pieces of action information extracted from the action information 12a. The items in column CL3 (start timing) in table TC1 are start timings defined by the start timing definer 11a.

For ease of understanding of description, table TC1 illustrated in FIG. 4A is changed into a Gantt chart as illustrated in FIG. 4B. The width of each rectangle along the time axis illustrated in FIG. 4B is a duration of each action, and may be acquired from the action information 12a or defined by the start timing definer 11a.

The numerals added to actions TL1 to TL6 illustrated in FIG. 4B respectively correspond to the numerals of the start timings of the actions illustrated in table TC1 of FIG. 4A. For example, action TL3 is an action "move to the front of the shelf", for which start timing a3 is defined. Action TL4 is an action "take a dish", for which start timing a4 is defined.

The information of the actions whose start times have been defined by the start timing definer 11a is detailed below on a time-series basis. The robot 40 sets food in the microwave oven (action TL1). The robot 40 heats the food in the microwave oven (action TL2). Here, the robot 40 is included in the executors of action TL2 because action TL2 includes an action that the robot 40 performs with respect to the microwave oven, such an action to switch on the microwave oven.

Simultaneously with action TL2, the robot 40 moves to the front of the shelf (action TL3), takes a dish (action TL4), and moves to the front of the microwave oven (action TL5). Then, the robot 40 takes the food from the microwave oven (action TL6), and ends the target work.

In the method of planning by the start timing definer 11a, the following conventional algorithms may be used as necessary. To prepare a flowchart, it is possible to use STRIPS, Graphplan, NOAH, SATplan, FastDownward, or FastForward. To prepare a Gantt chart, it is possible to use TemporalFastDownward or SGPlan. In producing a flowchart, the start timing of each action may be defined by the start timing definer 11a.

In a work plan prepared in a conventional method, action TL2 and actions TL3 to TL5 are in parallel to each other even though all of actions TL2 to TL5 involve the robot 40 to serve as an executor. This caused a possibility in which the prepared work plan is not accomplished reliably.

Also in a work plan prepared in a conventional method, the actions (action TL1 to TL6) have their start timings fixed. Thus, if the durations (time spans) of the actions are subject to change due to an occurrence such as a disturbance, there was a possibility in which the prepared work plan is not accomplished reliably.

In view of this, the embodiment prepares a work plan to reliably perform target work even though the target work includes parallel actions or even if the durations of the actions are subject to change. This will be described below.

Referring back to FIG. 3, the work planner 10 will be further described. The start timing definer 11a outputs the initial work plan information 12b. The initial work plan information 12b includes pieces of action information and other pieces of information that are combined together to perform the target work.

The initial work plan information 12b stores pieces of action information included in the work plan prepared by the start timing definer 11a along with pieces of start timing information respectively corresponding to the pieces of action information. In the following description, the action information, the dependency information, and the start timing information will be occasionally collectively referred to as "action information".

The initial work plan information 12b outputs first action information, first dependency information, and first start timing information. The first action information, the first dependency information, and the first start timing information are concerning an action of the work plan that is to be performed first of all. FIG. 3 illustrates the information concerning a k-th (natural number) action and a (k+1)th action of the work plan as k-th ((k+1)th) action information, k-th ((k+1)th) dependency information, and k-th ((k+1)th) start timing information.

The divider 11b receives the initial work plan information 12b output from the start timing definer 11a, and outputs the intermediate work plan information 12c. The intermediate work plan information 12c includes pieces of action information involving a plurality of executors classified on a different-executor basis.

The dividability determiner 11ba determines whether each piece of action information in the initial work plan information 12b is dividable. Specifically, when each piece of action information involves a plurality of executors, the dividability determiner 11ba determines that the piece of action information is dividable. When each action involves a single executor, the dividability determiner 11ba determines that the action is not dividable.

The action divider 11bb divides the action information determined by the dividability determiner 11ba as dividable into pieces of action information corresponding to the respective executors. Also, the action divider 11bb defines a start timing for each of the divided pieces of action information. For example, when the start effect of action B_1 described by referring to FIG. 1 occurs later than the start time of action B_1, the action divider 11bb defines the timing as start time of action B_2 (see FIG. 1).

The dependency information generator 11bc generates pieces of dependency information respectively concerning the pieces of the action information divided by the action divider 11bb, and relates the pieces of dependency information to the respective divided actions. Then, the dependency information generator 11bc outputs the intermediate work plan information 12c. The intermediate work plan information 12c includes the pieces dependency information in relation to the respective divided actions. In this embodiment, the dependency information generator 11bc generates pieces of dependency information respectively concerning the divided pieces of action information. This, however, should not be construed in a limiting sense. The dependency information generator 11bc may generate dependency information concerning all of the action information.

The dependency information generated by the dependency information generator 11bc may be generated anew or included in the action information 12a in advance. When the dependency information is generated anew, the dependency information is generated based on, for example, an effect (the above-described start effect and end effect) of a preceding action and a condition for starting a succeeding action.

When the dependency information is included in the action information 12a in advance, the pre-divided action information includes pieces of action information (and dependency information) corresponding to the respective executors. This pre-divided action information is divided by the dependency information generator 11bc, and the resulting pieces of action information include respective, corresponding pieces of dependency information.

With the above-described configuration, while a planner is working on a work plan, the planner does not need to take any executor into consideration; the planner only needs to design the work plan on a work basis. In other words, the planner only needs to take into consideration actions on a work basis, saving the planner off the work load.

In the intermediate work plan information 12c illustrated in FIG. 3, the k-th action information, the k-th dependency information, and the k-th start timing information are respectively divided into k_1-th and k_2-th action information, k_1-th and k_2-th dependency information, and k_1-th and k_2-th start timing information. FIG. 3 also illustrates in the intermediate work plan information 12c a case where the k-th action information, the k-th dependency information, and the k-th start timing information are not divided (updated) by the divider 11b, which is indicated by (k+1)th action information, (k+1)th dependency information, and (k+1)th start timing information in the intermediate work plan information 12c.

When the dividability determiner 11ba has determined action information as not dividable, the divider 11b reads data of this action information from the initial work plan information 12b, and outputs the data to the intermediate work plan information 12c without updating the data.

Figure 4C:
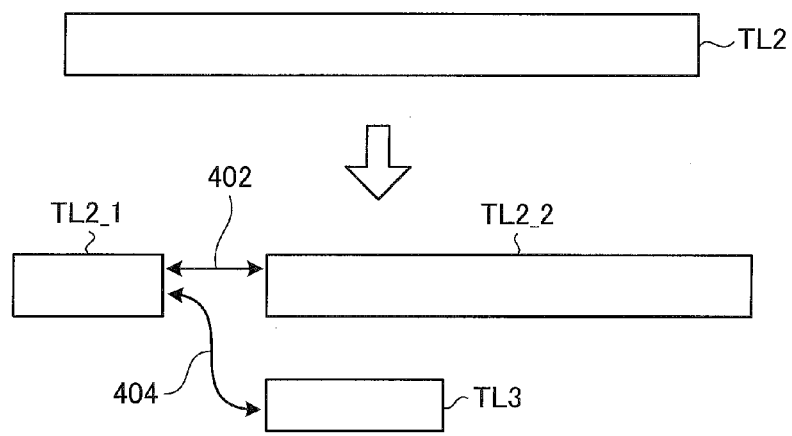
FIG. 4C illustrates processing performed by a divider.

Referring to FIG. 4C, processing performed by the divider 11b will be described. FIG. 4C illustrates the processing performed by the divider 11b. FIG. 4C illustrates a case in which action TL2, which is described above by referring to FIG. 4B, is divided into two actions respectively corresponding to two executors, namely, the robot 40 and the microwave oven.

The action divider 11bb divides action TL2 into two actions in accordance with the start effect described above by referring to FIG. 1. In this embodiment, action TL2 is divided into action TL2_1 and action TL2_2. Action TL2_1 corresponds to pre-processing involving the robot 40 to serve as the executor. Action TL2_2 corresponds to main processing involving the microwave oven to serve as the executor.

FIG. 3 illustrates an example in which the dependency information is included in the action information. It is also possible, however, to make the dependency information and action information independent of each other, and store the dependency information and action information separately in the work planner 10. In this case, the dependency information may be generated based on, for example, a start effect, an end effect, a start condition, and/or an end condition for the action. Here, it is possible to use an identifier to identify the action so as to relate the dependency information to a corresponding piece of action information. The dependency information may also be provided outside the work planner 10 insofar as the dependency information is accessible from the work planner 10.

Then, the dependency information generator 11 be generates dependency information concerning dependency of action TL2_1 relative to other actions including action TL2_2. Also, the dependency information generator 11bc generates dependency information concerning dependency of action TL2_2 relative to other actions including action TL2_1.

For example, the dependency information generator 11bc generates dependency information concerning dependency between actions TL2_1 and TL2_2 from the end effect of action TL2_1 and the start effect of action TL2_2 (see the arrow 402 in FIG. 4C). Also, the dependency information generator 11bc generates dependency information concerning dependency between actions TL2_1 and TL3 from the end effect of action TL2_1 and a start effect of action TL3 (see the arrow 404 in FIG. 4C).

Specifically, in the case of the arrow 402, the dependency information is generated from, for example, action TL2_1's end effect: "the robot 40 is at an operable position for the microwave oven" and action TL2_2's start effect: "the microwave oven is not in use". In the case of the arrow 404, the dependency information is generated from, for example, action TL2_1's end effect: "the robot 40 is at an operable position for the microwave oven" and action TL3's start effect: "the robot 40 is not operating".

The dependency information generator 11bc may generate dependency information concerning dependency between actions TL2_1 and TL2_2 from an end condition of action TL2_1 and a condition for starting action TL2_2. Also, the dependency information generator 11bc may generate dependency information concerning dependency between actions TL2_1 and TL3 from the end condition of action TL2_1 and a condition for starting action TL3.

Actions TL2_1 and TL3 both involve the robot 40. In such actions involving an identical executor, upon ending of the preceding action TL2_1, dependency information may be automatically generated to satisfy the condition for starting action TL3.

The start condition and the start effect of action TL2 may be used as they are to serve as the start condition and the start effect of action TL21. The end condition and the end effect of action TL2 may be used as they are to serve as the end condition and the end effect of action TL2_2.

Referring back to FIG. 3, the work planner 10 will be further described. The intermediate work plan information 12c is action information that has gone through the divider 11b. The details of the intermediate work plan information 12c are described above and will not be elaborated here.

The adjustor 11c receives the intermediate work plan information 12c output from the divider 11b, and outputs the work plan information 12d. In the work plan information 12d, the start time of each piece of the action information included in the received intermediate work plan information 12c is adjusted. Referring to FIGS. 4D to 4H, processing performed by the adjustor 11c will be described. FIGS. 4D to 4H illustrate first to fifth aspects of the processing performed by the adjustor 11c.

Figure 4D:
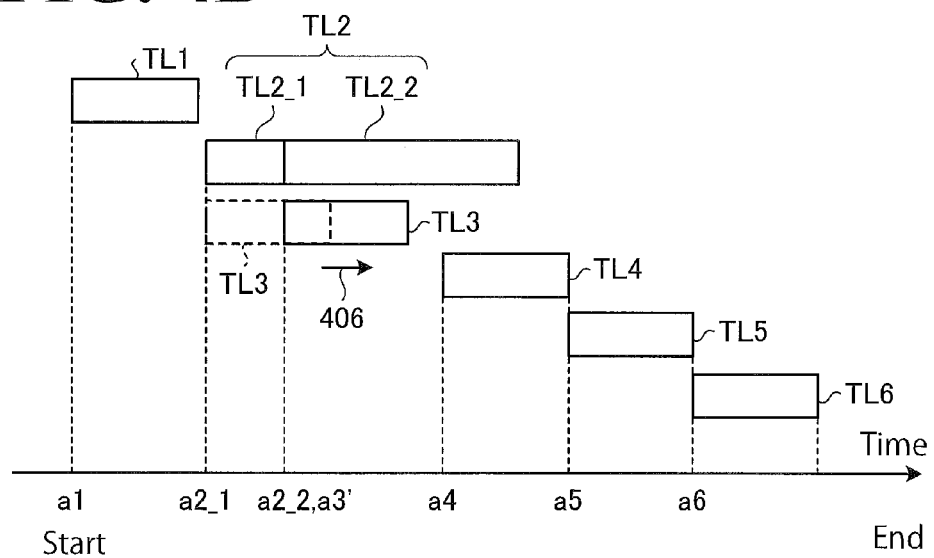
FIG. 4D illustrates a first aspect of processing performed by an adjustor.

First, by referring to FIG. 4D, the identical-executor adjustor 11ca and the inter-executorial adjustor 11cb will be described. FIG. 4D is a Gantt chart of an exemplary intermediate work plan read from the intermediate work plan information 12c.

When actions involving an identical executor overlap with each other on the time axis, the identical-executor adjustor 11ca adjusts the start timings of the actions to avoid the overlapping of the actions. Thus, a plurality of actions involving an identical executor are incorporated into a plan without contradiction.

FIG. 4D illustrates a case in which action TL3 overlaps with action TL2_1, and the start timing of action TL3 is adjusted (see the arrow 406 in FIG. 4D). In FIG. 4D, pre-adjusted action TL3 is indicated by a dotted line.

In the example illustrated in FIG. 4D, in order to avoid overlapping between actions TL3 and TL2_1, the start timing of action TL3 is delayed. This, however, should not be construed in a limiting sense. Another possible example is that the start timing of action TL2_1 is advanced. Still another possible example is that the start timing of action TL3 is delayed while the start timing of action TL2_1 is advanced.

Next, the inter-executorial adjustor 11*cb* will be described. The inter-executorial adjustor 11*cb* adjusts the start timings of at least two of a plurality of actions that do not involve an identical executor so as to cause the at least two of the plurality of actions to overlap with each other on the time axis. In FIG. 4B, there are no other actions overlapping with each other on the time axis, such as action TL1 overlapping with no other actions on the time axis. In this case, the above-described adjustment is not performed.

FIG. 4D illustrates an example in which action TL2_2 overlaps with actions TL3 and TL4. Thus, a work plan is prepared efficiently in which actions involving a plurality of executors are performed simultaneously.

Next, by referring to FIG. 4E, processing performed by the division adjustor 11*cc* and the identical-executor adjustor 11*ca* will be described. The division adjustor 11*cc* adjusts the start timings of the actions divided from one action by the divider 11*b* so as to cause the divided actions continue on the time axis.

Figure 4E:
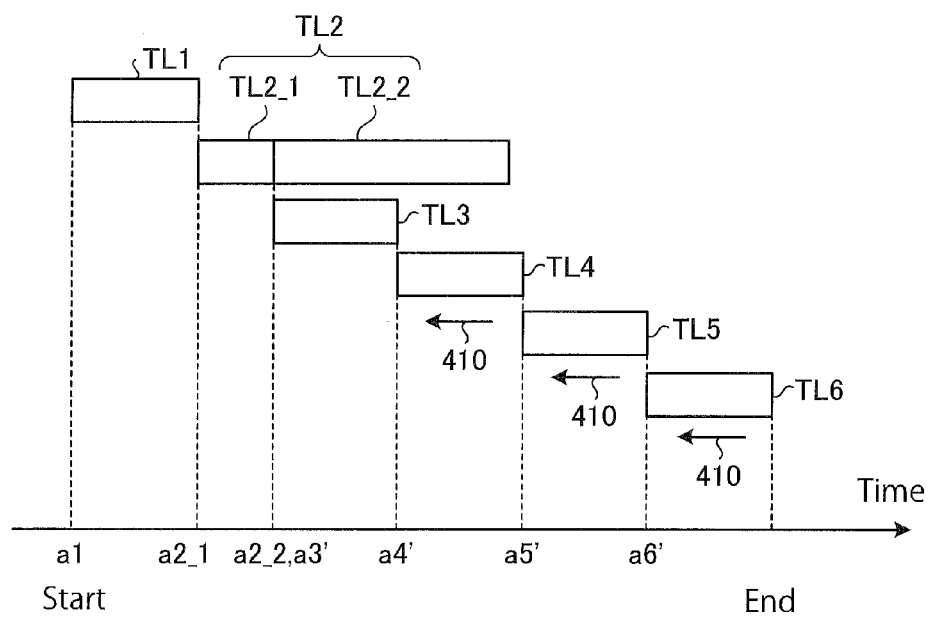
FIG. 4E illustrates a second aspect of the processing performed by the adjustor.

FIG. 4E illustrates a case in which the start timings of action TL4, action TL5, and action TL6 illustrated in FIG. 4D are adjusted to cause actions TL4, TL5, and TL6 to continue from action TL3 (see arrows 410 in FIG. 4E). In FIG. 4E, actions TL3 to TL5 each have an end time that matches the start time of the next action. Instead of a match between the end time and the start time, it is possible to provide a short interval between the end time and the start time.

Specifically, assume that there are a plurality of actions involving an identical executor, and that there is a predetermined time interval on the time axis between adjacent actions among the plurality of actions. In this case, the start timing of an action having the later start timing may be made closer to the end time of an action having the earlier start timing. This eliminates unnecessary waiting time in the group of actions involving the identical executor.

The identical-executor adjustor 11*ca*, the inter-executorial adjustor 11*cb*, and the division adjustor 11*cc* may perform respective processing in any desired order. That is, the arrows illustrated in FIG. 3 indicating directions in which the information flows in the adjustor 11*c* are provided merely for exemplary purposes.

Next, by referring to FIGS. 4F to 4H, processing performed by the standby adjustor 11*cd* will be described. The standby adjustor 11*cd* adjusts the start timings of actions based on dependency information in the action information 12*a* included in the intermediate work plan information 12*c*. Specifically, when a condition for starting one action among the actions includes an end of another action among the actions, the standby adjustor 11*cd* adjusts the start timing of the former action to make the start timing of the former action equal to or later than the end timing of the latter action.

In other words, in determining the start timing of the former action, the standby adjustor 11*cd* gives priority to the end timing of the latter action over the start time of the start timing information in the intermediate work plan information 12*c*.

Thus, the start timing of each action in the work plan is not fixed at a predetermined start time; instead, the start timing of each action is changeable in relation to the end timing of another action. This ensures that the work plan is executed reliably even if the durations (time spans) of the actions are subject to change due to an occurrence such as a disturbance. This will be described in detail below.

Figure 4F:
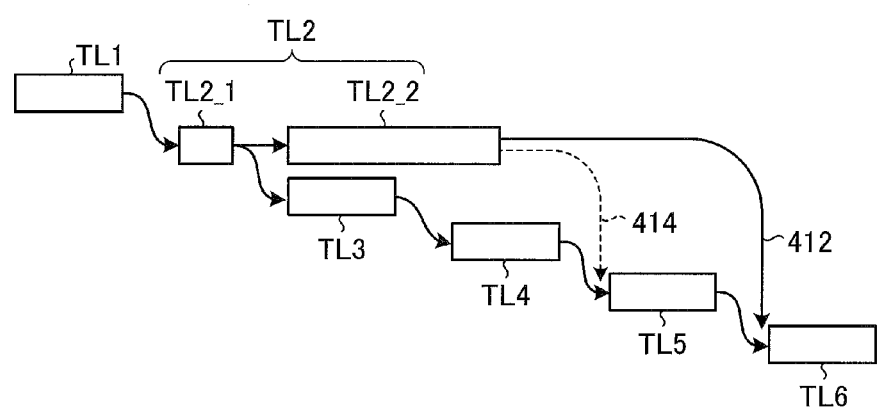
FIG. 4F illustrates a third aspect of the processing performed by the adjustor.

FIG. 4F schematically illustrates a relationship of ends and start conditions for actions that the standby adjustor 11*cd* prepares based on the dependency information included in the action information 12*a*. In FIG. 4F, each of the solid-line arrows indicates that the end of the action at the base end of the solid-line arrow is included in a condition for starting the action at the distal end of the solid-line arrow. The standby adjustor 11*cd* adjusts the start timings of actions TL1 to TL6 to satisfy the execution order of the actions indicated by the solid-line arrows.

Actions TL5 and TL6, for example, involve different executors from the executor involved in action TL2_2. The standby adjustor 11*cd* may prepare start conditions for actions TL5 and TL6 in the following manner.

The standby adjustor 11*cd* links action TL2_2 with action TL5, which has the earliest start timing after the end of action TL2_2 (see the arrow 414 in FIG. 4F). Then, the standby adjustor 11*cd* determines whether the end of action TL2_2 is included in the condition for starting action TL5.

In the example illustrated in FIG. 4F, the end of action TL2_2 is not included in the condition for starting action TL5. In this case, the standby adjustor 11*cd* eliminates the link indicated by the arrow 414. Then, the standby adjustor 11*cd* links action TL2_2 with action TL6, which has the second earliest start timing after the end of action TL2_2 next to action TL5, and determines whether the end of action TL2_2 is included in the condition for starting action TL6.

In the example illustrated in FIG. 4F, the end of action TL2_2 is included in the condition for starting action TL6. In this case, the standby adjustor 11*cd* establishes the link between actions TL2_2 and TL6 (see the arrow 412 in FIG. 4F). Specifically, the standby adjustor 11*cd* establishes this link to make the start timing of action TL6 equal to or later than action TL2_2. This facilitates reliable preparation of a work plan including parallel actions while eliminating or minimizing processing load on the work planner 10.

Next, by referring to FIGS. 4G and 4H, the start timings of actions linked by the standby adjustor 11*cd* will be described in more detail. For ease of understanding of description, the work plan described above by referring to FIG. 4F is changed into Gantt charts illustrated in FIGS. 4G and 4H.

The processing described below is performed when the robot 40 (see FIG. 2) executes a job program generated by the teacher 20 (see FIG. 2) based on the work plan information 12*d* including links among the start timings implemented by the standby adjustor 11*cd*.

The standby adjustor 11*cd* adds information for performing the processing described below to the work plan, and the teacher 20 changes the added information into a job in the form of, for example, a waiting (standby) command. In the following description, a job that the standby adjustor 11*cd* adds to the job for executing the work plan will be referred to as "standby adjustment job".

Figure 4G:
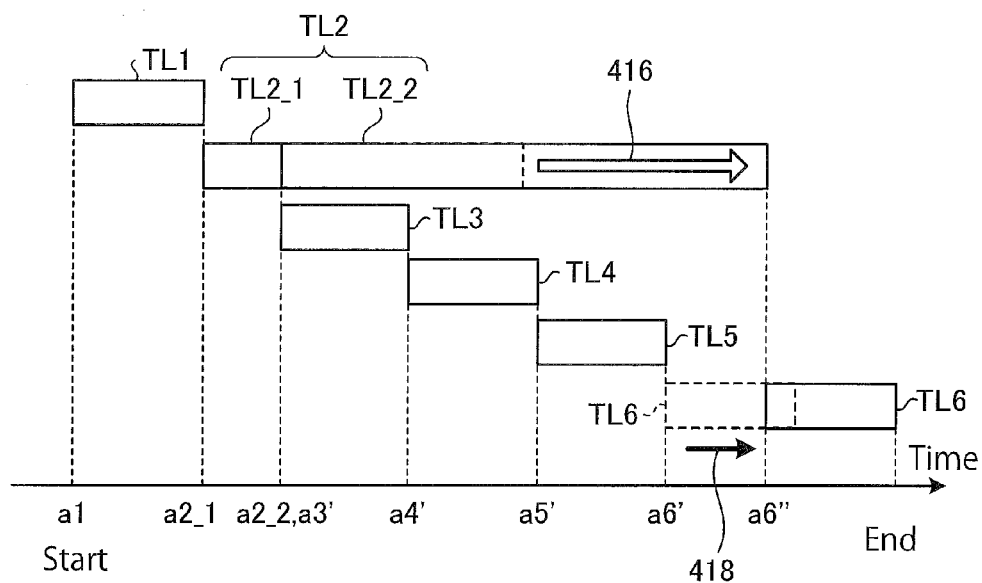
FIG. 4G illustrates a fourth aspect of the processing performed by the adjustor.

FIG. 4G illustrates a case in which the duration (time span) of action TL2_2 is prolonged by a disturbance, for example (see the arrow 416 in FIG. 4G). In this case, action TL2_2 is not ended yet at start timing a6'. In view of this, the standby adjustment job causes the start of action TL6 to wait for the end of action TL2_2 (see the arrow 418 in FIG. 4G).

Then, the standby adjustment job sets the start timing of action TL6 at the end timing of action TL2_2 (see start timing a6" in FIG. 4G). In FIG. 4G, action TL6 before subjected to the start timing adjustment is indicated by a dotted line.

Thus, even if the duration (time span) of an action in a work plan is prolonged from its initially intended duration, the start timing of an action dependent on the prolonged action is automatically adjusted. Consequently, the work plan is reliably executed.

Figure 4H:
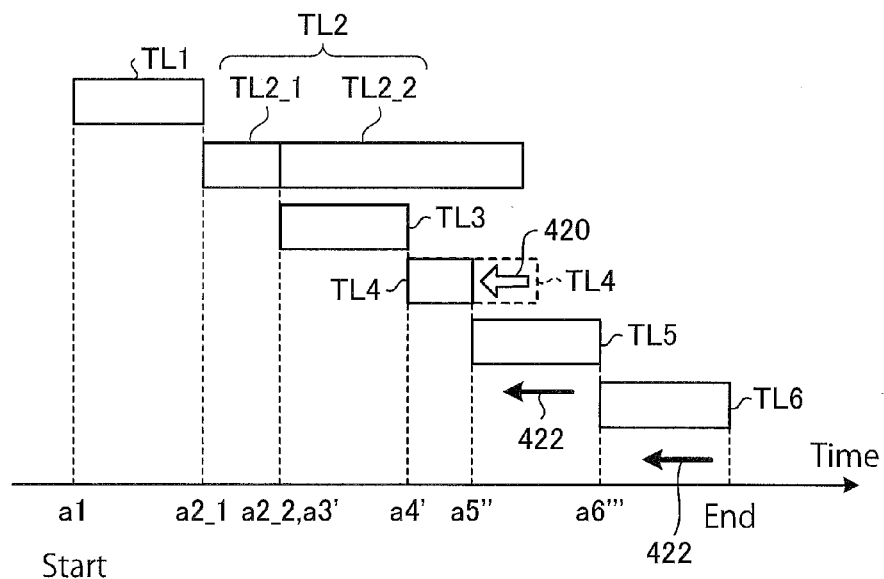
FIG. 4H illustrates a fifth aspect of the processing performed by the adjustor.

FIG. 4H illustrates a case in which the processing in action TL4 ends earlier than its initially intended end time (see the arrow 420 in FIG. 4H). In FIG. 4H, initially intended action TL4 is indicated by a dotted line.

In this case, the standby adjustment job shifts the start timings of actions TL5 and TL6 to the earlier side on the time axis in accordance with the end of action TL4 (see arrows 422 in FIG. 4H). In FIG. 4H, the shifted start timings of actions TL5 and TL6 are respectively indicated as start timings a5" and a6".

Thus, even if the duration (time span) of an action in a work plan is shortened from its initially intended duration, the start timing of an action dependent on the shortened action is automatically adjusted. This ensures rapid execution of the work plan.

In this manner, the standby adjustor 11cd according to this embodiment automatically changes the start timings of the actions in a work plan. This ensures reliable execution of the work plan while accommodating to a change, if any, in the duration (time span) of an action.

Referring back to FIG. 3, the work planner 10 will be further described. The standby adjustor 11cd outputs work plan information as the work plan information 12d. There is no particular limitation to the execution order of the identical-executor adjustor 11ca, the inter-executorial adjustor 11cb, the division adjustor 11cc, and the standby adjustor 11cd of the adjustor 11c. Therefore, the last processor among the above-described processors outputs the work plan information 12d. Then, the work plan information 12d is read by the teacher 20 (see FIG. 2) and used as a work plan for the executors including the robot 40 (see FIG. 2).

In FIG. 3, "'" (prime) is used to indicate the pieces of information that have gone through the adjustor 11c, namely, the k_1-th and k_2-th action information, k_1-th and k_2-th dependency information, and k_1-th and k_2-th start timing information. The intermediate work plan information 12c and the work plan information 12d may not necessarily be different from each other but may be the same in some cases.

A possible example is that the k_1-th and k_2-th action information, the k_1-th and k_2-th dependency information, and the k_1-th and k_2-th start timing information are not updated by the adjustor 11c, and the (k+1)th action information, the (k+1)th dependency information, and the (k+1) th start timing information that have not been divided (updated) by the divider 11b illustrated in FIG. 3 are updated by the adjustor 11c.

It should be noted that all or desired part of the above-described processing functions executed in the work planner 10 may be implemented by a computer and a program analyzed and executed by the computer or may be implemented as hardware by a wired logic control system. Such a computer may be provided outside of the work planner 10 and communicate with the work planner 10.

The program may be distributed through a network such as the Internet. The program may also be recorded in a computer-readable storage medium such as a hard disk drive and a digital versatile disk (DVD), and read from the recording medium and executed by the computer.

In the above description, the work planner 10 stores the action information 12a and the initial work plan information 12b. Instead of storing the action information 12a and the initial work plan information 12b, the work planner 10 may acquire the initial work plan information 12b generated in advance. In this case, the work planner 10 may include an acquirer to acquire initial work plan information in place of the action information 12a, the start timing definer 11a, and the initial work plan information 12b.

In the above description, the divider 11b generates the intermediate work plan information 12c and stores the generated intermediate work plan information 12c in the work planner 10. This, however, should not be construed in a limiting sense. Another possible example is that the divider 11b does not generate the intermediate work plan information 12c, but processes the initial work plan information 12b and outputs a result of the processing to the adjustor 11c at any desired time intervals. Similarly, the work plan information 12d may not necessarily be stored in the work planner 10. For example, the work plan information 12d may be transmitted to the teacher 20 (see FIG. 2) at any desired time intervals.

Figure 5:
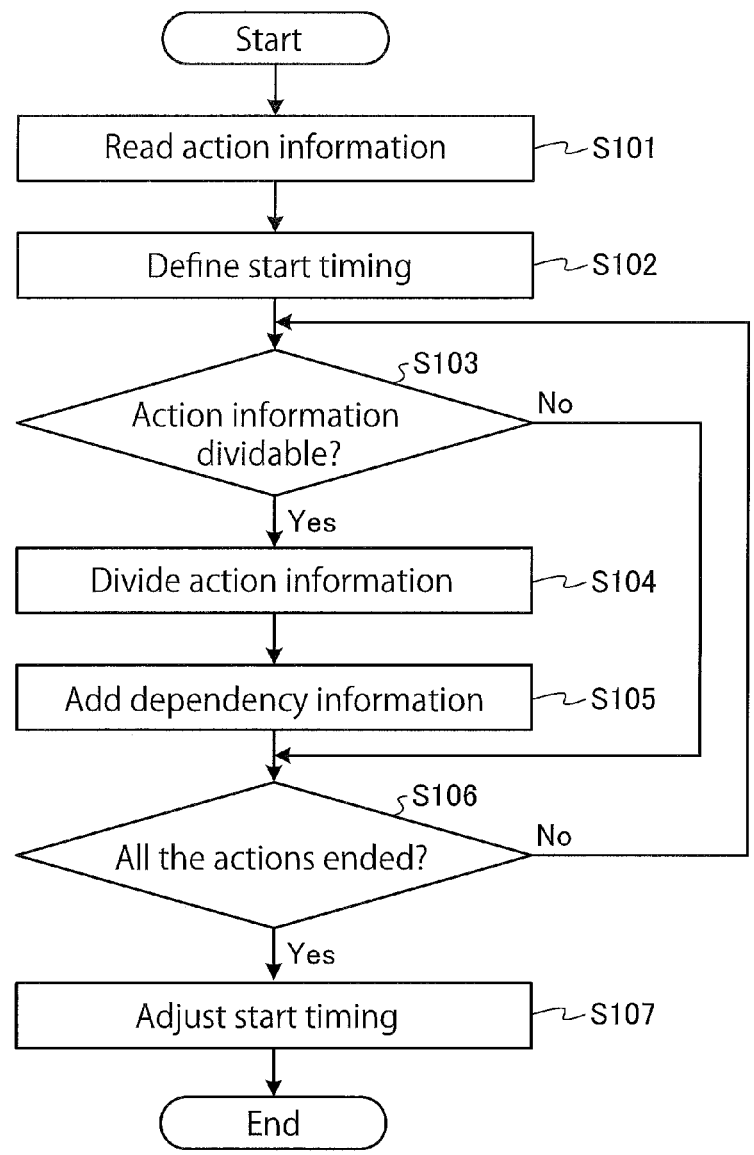
FIG. 5 is a flowchart of a procedure for processing performed by the work planner according to the embodiment.

Next, by referring to FIG. 5, a procedure for processing performed by the work planner 10 according to this embodiment will be described. FIG. 5 is a flowchart of the procedure for the processing performed by the work planner 10 according to this embodiment.

As illustrated in FIG. 5, the start timing definer 11a reads action information from the action information 12a (step S101). The start timing definer 11a defines a start timing for the read action information (step S102).

The dividability determiner 11ba determines whether the action information is dividable based on the number of executors of the action (step S103). When the dividability determiner 11ba determines that the action information is dividable (Yes at step S103), that is, when the action involves a plurality of executors, the action divider 11bb divides the action information on a one-executor basis (step S104). Then, the dependency information generator 11bc adds dependency information to each of the pieces of action information divided by the action divider 11bb (step S105).

Then, a determination is made as to whether processing for all actions has ended (step S106). When the determination is made that the processing for all the actions has ended (Yes at step S106), the adjustor 11c performs start timing adjustment processing (step S107), and the processing ends. When the dividability determiner 11ba determines that the action information is not dividable at step S103 (No at step S103), the processing at step S106 is performed without performing the processing at step S104 and step S105. When a determination is made that processing for all the actions has not ended at step S106 (No at step S106), the processing at and later than step S103 is repeated.

Figure 6:
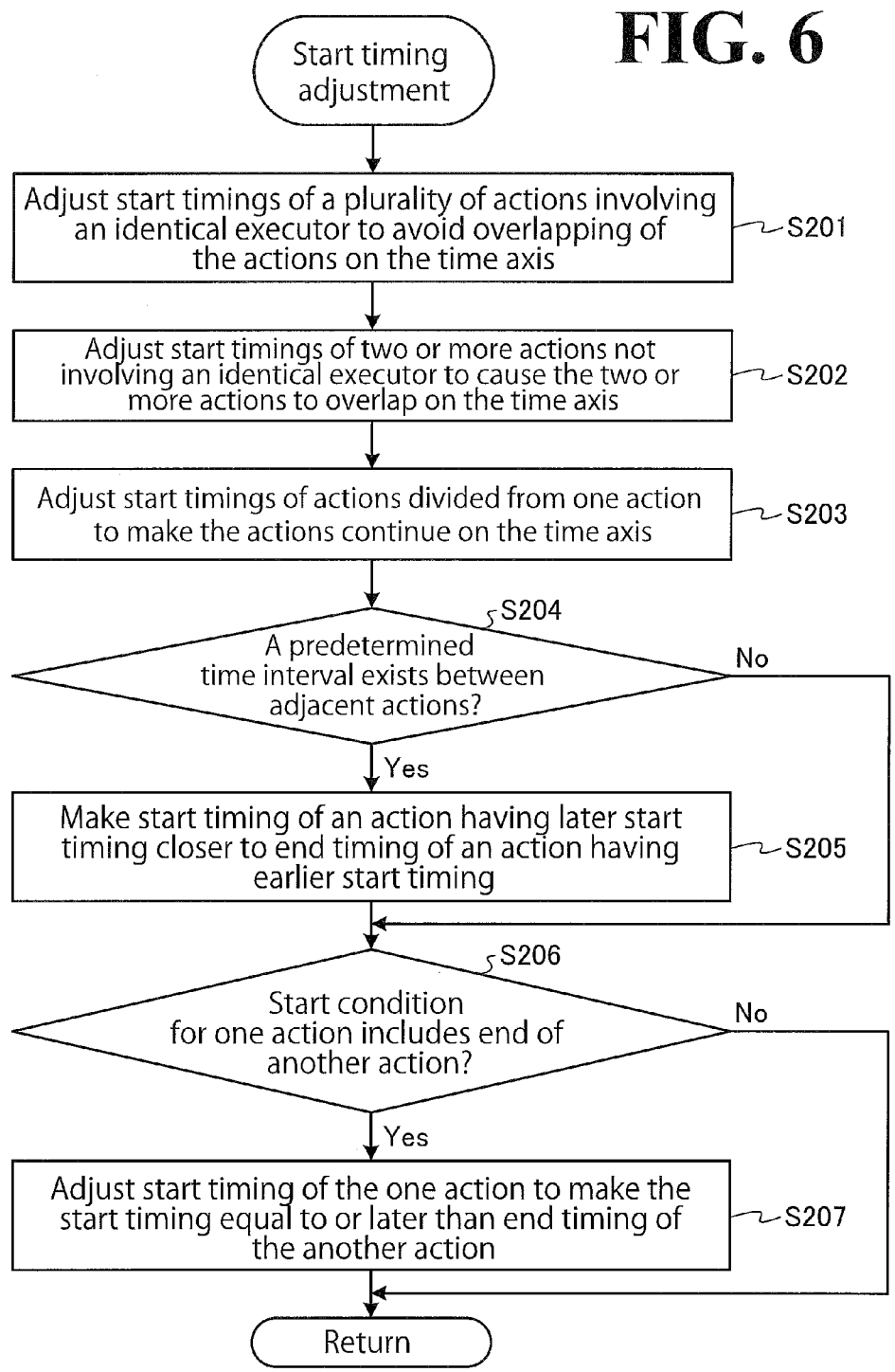
FIG. 6 is a flowchart of a procedure for start timing adjustment processing.

Next, by referring to FIG. 6, description will be made with regard to a detailed processing procedure for the start timing adjustment processing at step S107 of FIG. 5. FIG. 6 is a flowchart of the processing procedure for the start timing adjustment.

Based on the dependency information, the identical-executor adjustor 11ca adjusts the start timings of a plurality of actions involving an identical executor so as to avoid overlapping of the plurality of actions on the time axis (step S201).

Based on the dependency information, the inter-executorial adjustor 11cb adjusts the start timings of two or more of a plurality of actions that do not involve an identical executor so as to cause the two or more of the plurality of actions to overlap with each other on the time axis (step S202).

Based on the dependency information, the division adjustor 11cc adjusts the start timings of actions divided from one action by the divider 11b so as to make the divided actions continue on the time axis (step S203). The order of the processing at steps S201 to S203 may be changed into any other order.

Next, when a predetermined time interval exists between adjacent two of the plurality of actions involving an identical executor on the time axis (Yes at step S204), then based on the dependency information, the inter-executorial adjustor 11cb makes the start timing of one action among the adjacent two actions that has a later start timing closer to the end timing of the other action that has an earlier start timing (step S205).

When no predetermined time interval exists between adjacent two of the plurality of actions involving an identical executor on the time axis (No at step S204), the processing at and later than step S206 is executed.

When a condition for starting one action among the plurality of actions includes the end of another action among the plurality of actions (Yes at step S206), the standby adjustor 11cd adjusts the start timing of the former action to make the start timing of the former action equal to or later than the end timing of the latter action (step S207). Then, the processing returns.

When a condition for starting one action among the plurality of actions does not include the end of another action among the plurality of actions (No at step S206), the processing returns.

Figure 7:
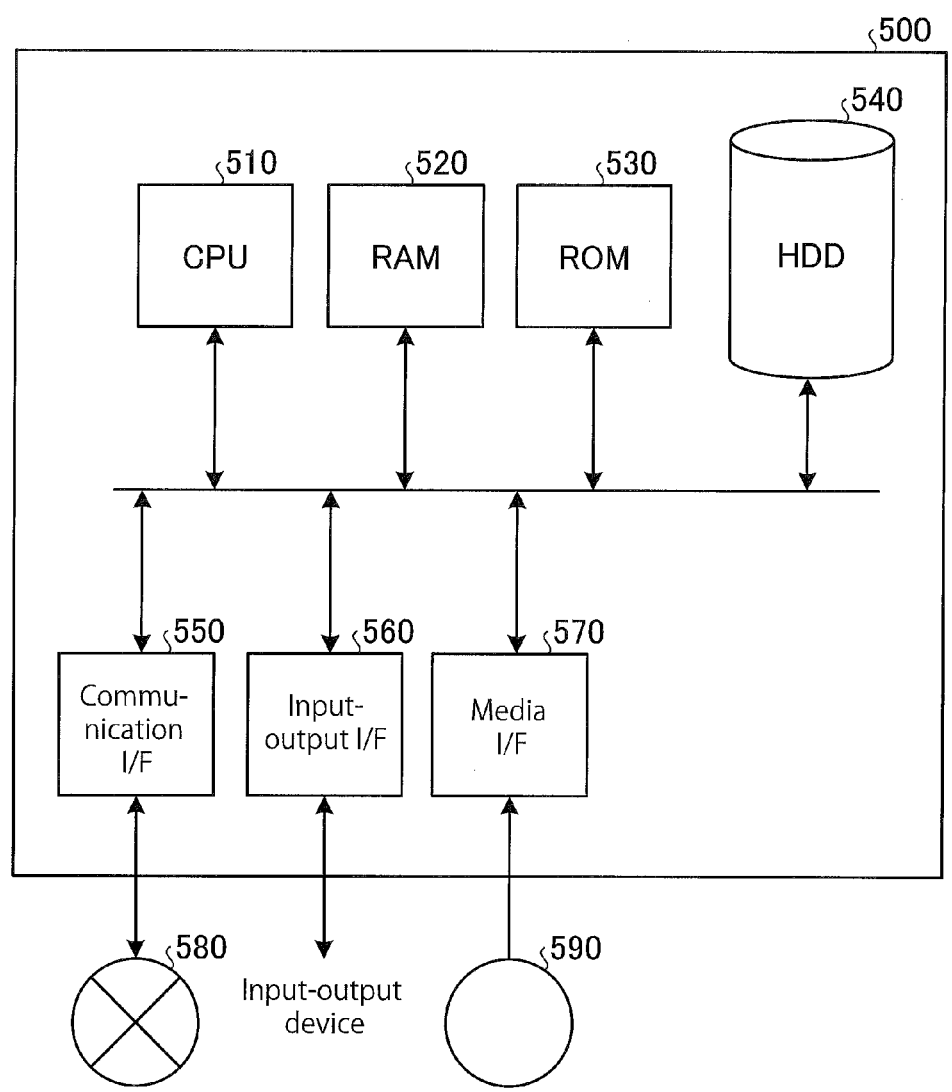
FIG. 7 is a hardware configuration diagram of an exemplary computer to implement functions of the work planner.

The work planner 10 according to this embodiment is implemented by a computer 500 having an exemplary configuration illustrated in FIG. 7. FIG. 7 is a hardware configuration diagram of an example of the computer 500 to implement the functions of the work planner 10.

The computer 500 includes a central processing unit (CPU) 510, a random access memory (RAM) 520, a read only memory (ROM) 530, a hard disk drive (HDD) 540, a communication interface (I/F) 550, an input-output interface (I/F) 560, and a media interface (I/F) 570. The computer 500 may further include a solid state drive (SSD) and make the SSD perform part or all of the functions of the HDD 540. An SSD may be provided in place of the HDD 540.

The CPU 510 operates based on programs stored in one or both of the ROM 530 and the HDD 540 so as to control the components of the computer 500. The ROM 530 stores programs such as boot programs executed by the CPU 510 at the startup of the computer 500, and programs dependent on the hardware of the computer 500.

The HDD 540 stores programs and data such as programs executed by the CPU 510 and data used by the programs. The communication interface 550 receives data from other devices through a network 580 and transmits the data to the CPU 510. The communication interface 550 also transmits data generated by the CPU 510 to other devices through the network 580.

Through the input-output interface (I/F) 560, the CPU 510 controls output devices such as a display and a printer and controls input devices such as a mouse and a keyboard. The CPU 510 acquires data from the input devices through the input-output interface (I/F) 560. The CPU 510 also outputs generated data to the output devices through the input-output interface (I/F) 560.

The media interface 570 reads programs and data stored in a storage medium 590 and provides the CPU 510 with the programs and data through the RAM 520. The CPU 510 loads the programs from the storage medium 590 onto the RAM 520 through the media interface 570, and executes the loaded programs. Examples of the storage medium 590 include, but are not limited to, a magneto-optical recording medium such as a DVD, and a semiconductor memory.

In an exemplary case in which the computer 500 functions as the work planner 10, the CPU 510 of the computer 500 executes the programs loaded on the RAM 520 to implement the functions of the start timing definer 11a, the divider 11b, and the adjustor 11c.

The CPU 510 of the computer 500 reads the programs from the storage medium 590 and executes the programs. Another possible example is that the CPU 510 acquires the programs from other devices through the network 580. The HDD 540 is capable of storing the action information, the initial work plan information, the intermediate work plan information, and the work plan information.

As has been described hereinbefore, the work planner according to this embodiment includes the divider and the adjustor. Action information includes a plurality of first actions indicating work units. Each of the first actions involves one executor or a plurality of executors including a robot. The first actions start at respective defined start timings. Based on the action information, the divider divides an action, among the first actions, that involves a plurality of executors into a plurality of second actions corresponding to the respective executors.

Dependency information indicates a relationship of dependence among the first actions including the second actions divided by the divider. Based on the dependency information, the adjustor adjusts the start timing of at least one of a plurality of third actions, among the first actions, that involve an identical executor.

The work planner according to this embodiment thus configured ensures efficient preparation of a work plan involving a plurality of executors.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot system for planning work to be performed by a plurality of executors, at least one executor being formed by a robot, comprising
   a processor that executes work planning functions, the processor programmed to:
   determine that at least one action among a plurality of first actions is dividable in response to a determination that the at least one action among the plurality of first actions involves more than one executor of the plurality of executors;
   determine that at least one action among the plurality of first actions is not dividable in response to a determination that the at least one action is determined to involve a single executor;
   divide at least one dividable action among the plurality of first actions that involves, prior to the division, a first executor and a second executor of the plurality of executors into a plurality of second actions respectively corresponding to the first executor and the second executor based on action information that includes the plurality of first actions and dependency information, the first actions indicating work units that involve at least one executor and that start at respective defined start timings;
   adjust a start timing of at least one third action based on dependency information indicating a relationship of dependency among the plurality of first actions, and based on a determination that the at least one third action and at least one of the second actions temporally overlap and involve a same one of the plurality of executors, such that the at least one third action and the at least one of the second actions that involve the same one of the plurality of executors no longer temporally overlap; and output an instruction for the control of at least one executor according to at least one of the first actions, the second actions, and the third action.

2. The robot system according to claim 1, wherein the processor is further programmed to adjust the start timing of the at least one of the third actions based on the dependency information to avoid overlapping of the third actions on a time axis.

3. The robot system according to claim 1, wherein the processor is further programmed to, based on the dependency information, adjust the start timings of at least two fourth actions, among the plurality of first actions, that do not involve the same executor so as to cause the at least two fourth actions to overlap with each other on a time axis.

4. The robot system according to claim 1, wherein the processor is further programmed to generate, based on the action information, the dependency information concerning the second actions.

5. The robot system according to claim 1, wherein the processor is further programmed to define the start timings of the plurality of first actions based on the action information, and wherein the processor is further programmed to divide the plurality of first actions whose start timings were previously defined.

6. The robot system according to claim 1, wherein the processor is further programmed to adjust, based on the dependency information, the second actions to make the second actions continue on a time axis.

7. The robot system according to claim 1, wherein the processor is further programmed to, when a condition for starting one action among the plurality of first actions comprises an end of another action among the plurality of first actions, adjust the start timing of the one action to make the start timing of the one action equal to or later than an end timing of the another action based on the dependency information.

8. The robot system according to claim 2, wherein the processor is further programmed to, when a predetermined time interval exists on the time axis between two adjacent third actions, make the start timing of one of the two adjacent third actions that has a later start timing closer to an end timing of another one of the two adjacent third actions, the another one of the two actions comprising an earlier start timing based on the dependency information.

9. The robot system according to claim 1, wherein the at least one third action with the adjusted start timing and the at least one of the second actions both remain assigned to the same one of the plurality of executors after the start timing of the at least one third action is adjusted.

10. The robot system according to claim 9, wherein the processor is further programmed to adjust the start timing of a fourth action, among the plurality of first actions, that does not involve the same executor as the second action so as to cause the fourth action to temporally overlap with the second action.

11. The robot system according to claim 1, wherein the first executor is formed by the robot and the second executor is formed by an executor operated by the robot.

12. The robot system according to claim 11, wherein the adjusted start timing of the at least one third action is adjusted based upon an availability of the robot after operating the second executor during one of the plurality of second actions.

13. The robot system according to claim 1, wherein the processor is further programmed to adjust the start timing of the at least one of the third action based upon a start condition of one of the plurality of second actions, the start condition of the one of the second actions being different than a start condition of the at least one dividable action among the plurality of first actions prior to the division.

14. The robot system according to claim 1,
wherein, prior to the division, the at least one dividable action among the plurality of first actions involves the first executor, which is formed by the robot, and the second executor, which is formed by an executor operated by the robot, and wherein, after the division, a first one of the plurality of second actions involves the robot and a second one of the plurality of second actions involves the executor operated by the robot.

15. A method for performing work by a robot system, the method comprising:

determining that at least one action among a plurality of first actions is dividable in response to a determination that the at least one action among the plurality of first actions involves more than one executor;

determining that at least one action among the plurality of first actions is not dividable in response to a determination that the at least one action is determined to involve a single executor;

dividing one dividable action among the plurality of first actions that involves, prior to division, a first executor and a second executor of a plurality of executors into a plurality of second actions respectively corresponding to the first executor and the second executor based on action information that includes the plurality of first actions and dependency information, the first actions indicating work units that involve at least one executor formed by a robot, the first actions starting at respective defined start timings;

determining that at least one third action and at least one of the second actions temporally overlap and involve a same one of the plurality of executors;

adjusting a start timing of the at least one third action based on dependency information indicating a relationship of dependency among the plurality of first actions, such that the at least one third action and the at least one of the second actions that involve the same one of the plurality of executors no longer temporally overlap; and controlling the executor involved with the at least one third action and the at least one of the second actions to operate in accordance with the adjusted start timing.

16. The method according to claim 15,
wherein the first executor is formed by the robot and the second executor is formed by an executor operated by the robot, and wherein adjusting the start timing of the at least one third action is performed based upon an availability of the robot after the robot operates the second executor during one of the plurality of second actions.

17. The method according to claim 15, wherein adjusting the start timing of the at least one of the third action is performed based upon a start condition of one of the plurality of second actions, the start condition of the one of the second actions being different than a start condition of the at least one dividable action among the plurality of first actions prior to the division.

18. The method according to claim 15,
wherein, prior to the division, the at least one dividable action among the plurality of first actions involves the first executor, which is formed by the robot, and the second executor, which is formed by an executor operated by the robot, and
wherein, after the division, a first one of the plurality of second actions involves the robot and a second one of the plurality of second actions involves the executor operated by the robot.

19. A non-transitory computer-readable storage medium storing instructions for causing a computer to execute processing comprising:
determining that at least one action among a plurality of first actions is dividable in response to a determination that the at least one action among the plurality of first actions involves more than one executor;
determining that at least one action among the plurality of first actions is not dividable in response to a determination that the at least one action is determined to involve a single executor;
dividing one dividable action among the plurality of first actions that involves, prior to division, a first executor and a second executor of a plurality of executors into a plurality of second actions respectively corresponding to the first executor and the second executor based on action information that includes the plurality of first actions and dependency information, the first actions indicating work units that involve at least one executor formed by a robot, the first actions starting at respective defined start timings;
adjusting a start timing of at least one third action that involves one of the plurality of executors based on dependency information indicating a relationship of dependency among the plurality of first actions, and based on a determination that at least the at least one third action and at least one of the second actions temporally overlap and involve a same one of the plurality of executors, such that the at least one third action and the at least one of the second actions that involve the same one of the plurality of executors no longer temporally overlap; and
outputting an instruction for the control of at least one executor according to at least one of the first actions, the second actions, and the third action.

20. A robot system comprising:
a plurality of executors, at least one of the executors being formed by a robot;
a storage device that stores action information that includes a plurality of first actions and dependency information, the first actions indicating work units that involve at least one of the executors and that start at respective start timings, the dependency information indicating a relationship of dependency among the plurality of first actions;
a controller; and
a processor that executes work planning functions, the processor programmed to:
determine that at least one action among the plurality of first actions is dividable in response to a determination that the at least one action among the plurality of first actions involves more than one executor of the plurality of executors;
determine that at least one action among the plurality of first actions is not dividable in response to a determination that the at least one action is determined to involve a single executor;
divide at least one dividable action among the plurality of first actions that involves, prior to the division, a first executor and a second executor of the plurality of executors into a plurality of second actions respectively corresponding to the first executor and the second executor based on the action information; and
adjust a start timing of at least one third action based on the dependency information, and based on a determination that the at least one third action and at least one of the second actions temporally overlap and involve a same one of the plurality of executors, such that the at least one third action and the at least one of the second actions that involve the same one of the plurality of executors no longer temporally overlap,
wherein the controller is configured to control the robot according to at least one of the first actions, the second actions, and the third action.

* * * * *